Patented Oct. 21, 1924.

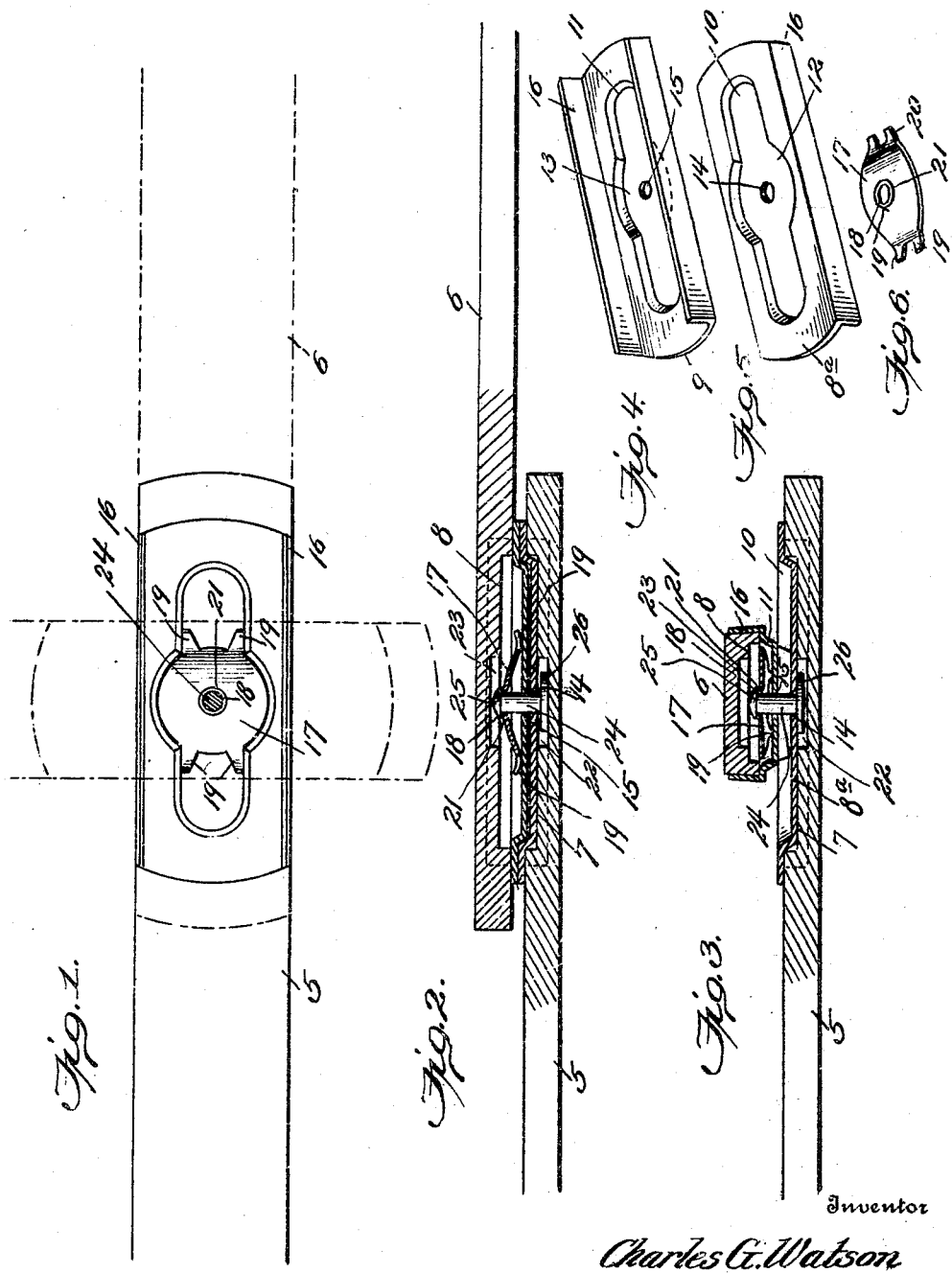

1,512,728

UNITED STATES PATENT OFFICE.

CHARLES G. WATSON, OF SENECA FALLS, NEW YORK, ASSIGNOR TO WESCOTT RULE COMPANY, INC., OF SENECA FALLS, NEW YORK, A CORPORATION OF DELAWARE.

SPRING JOINT FOR FOLDING RULES.

Application filed February 3, 1922. Serial No. 533,861.

*To all whom it may concern:*

Be it known that I, CHARLES G. WATSON, a citizen of the United States, residing at Seneca Falls, in the county of Seneca and State of New York, have invented new and useful Improvements in Spring Joints for Folding Rules, of which the following is a specification.

This invention relates to folding rules comprising a series of sections terminally overlapped and jointed or connected by hinge plates or members pivotally associated and engaged by frictional springs.

In folding rules of the so-called spring joint or zigzag type as heretofore constructed, two of the most essential elements, namely, the pivot pin and spring, have been formed and assembled in various ways to effect a positive pivotal action between the terminals of the rule sections and a temporary lock for the rule section terminals when the latter are opened and closed. In many of the rule structures of the type specified, or composed of a series of folding sections terminally connected, the spring element has been provided with oppositely extending extremities relatively to a center, or presents an elongated structure with a pivot opening through the center, but under the most favorable constructions and wherein the central part of each of the springs has been enlarged to reinforce or strengthen the same, fracture is liable to ensue particularly in the opposite extremities, or where the latter intersect or continue from the enlarged central member.

One object of the present improved joint for folding rules of the zigzag type is to provide a more durable joint by employing a round spring without the usual oppositely extending legs or projections and properly proportioned and arched and having an opening through the center thereof which is surrounded or reinforced by a boss or raised edge. A further object of the invention is to provide a round spring element for folding rule joints adapted to be disposed between a plate or member secured to the extremity of one of the rule sections and a portion of said latter section, and having relatively operating depressed and projecting portions and a seat of the same form as the circular or round spring, the spring being in addition provided with prongs or guides which do not in any manner function with the spring or in relation to its action, but simply act as holding means for the spring to maintain the latter in its correct position on or between the plates, the prongs bearing closely against the side walls of the metal plate or section having the depressed portions therein on opposite sides of the center.

By using the circular or round spring a very strong spring element is provided, and when this circular or round spring is properly proportioned to overcome practically all danger of breakage, or the existing fault of the long springs now commonly employed in rule joints of the type specified, the folding rule equipped with this improvement may be subjected to considerably harder usage than is permitted with the constructions commonly employed at the joints of the known forms of folding rules, with material advantages in economy and service of this class of devices. The raised center or boss on the circular or round spring around the pivot opening or hole has a preferred taper and shape to render it effective in eliminating certain friction that would arise between the pivot head and the spring, and furthermore, this raised boss or center reinforcement overcomes any possible fracture or chilling that may occur in the flat form of spring, or one without the boss, and particularly during the forming operation or in the process of tempering, which is an especially delicate operation. The raised center or boss also provides an easy seat for the pivot head.

The improved structure embodying the present features of invention will be more fully hereinafter described and claimed in preferred form, reference being had to the accompanying drawings, wherein:

Fig. 1 is a plan view of one extremity of a rule section with the head of the pivot removed and showing the cooperating rule section extremity in dotted lines and the adjustment of the jointed parts also in dotted lines;

Fig. 2 is a longitudinal vertical section through the center of the jointed extremities of sections of a folding rule embodying the features of the invention;

Fig. 3 is a longitudinal vertical section through the extremity of one section of a folding rule and a transverse section through a cooperating extremity of a rule section which has been turned on the former section, and illustrating the action of the parts under tension;

Figs. 4 and 5 are detail perspective views of the plates or joint members which are attached to the extremities of the rule sections; and Fig. 6 is a detail perspective view of the improved spring.

The numerals 5 and 6 designate adjoining end portions or extremities of two rule sections of a folding or zigzag rule, said section extremities being respectively formed with recesses 7 and 8 in their opposing faces to receive portions of the joint members. It will be understood that the extremities of the rule sections are overlapped, as clearly shown by Fig. 2, and said extremities also have hinge plates 8$^a$ and 9 secured thereto, said plates being of the form particularly shown by Figs. 4 and 5. The plate 8$^a$ has a depression 10 therein opposed to the recess 7 of the extremity 5 of the one rule section to which it is applied, so as to fit in said recess for the purpose of cooperating with and receiving a correspondingly shaped depression 11 in the other hinge plate 9, the dimensions of the two depressions 11 and 10 being such that the former will readily slip into the latter when the extremities 5 and 6 of the rule sections are disposed in longitudinal relation either in open or closed positions. The depressions 10 and 11 extend longitudinally of their respective hinge plates 8$^a$ and 9 and each has a central seat designated by 12 and 13 in the said plates 8$^a$ and 9. The seats 12 and 13 if they were continued would be circular in form and provide central enlargements of the depressions 10 and 11. Through the center of what may be termed the bottom portions of the seats 12 and 13 are pivot openings 14 and 15. As in the ordinary folding rule constructions embodying hinge plates of this type, the movement of the extremities of the rule sections to dispose the plates 8$^a$ and 9 at an angle to a longitudinal disposition thereof will effect a movement of the depression 11, for instance, out of the depression 10 against the resistance of a yielding element, which in the present instance constitutes the main feature of the invention. These hinge plates 8$^a$ and 9 are usually constructed of sheet metal and the formation of a depression in one face of each plate provides a corresponding projection on the opposite face, the plates also having side flanges, as at 16, to embrace and be secured to the side edge portions of the extremities 5 and 6 over the recesses 7 and 8. Therefore, it will be seen that the projection on the one face of the plate 9 when in engagement with the depression 10 of the remaining plate 8$^a$ provides an effective lock to prevent the rule sections from having loose movement when said sections are fully opened or closed.

The essential feature of the present improvement is a circular or round spring 17, shown in detail by Fig. 6, the said spring being cupped or dished and snugly fitting within the seat 13 of the plate 9, the seat 12 of the plate 8$^a$ serving to receive the projection provided by the seat 13 in the plate 9 as an additional locking feature, and whereby when the two plates 8$^a$ and 9 are in a locked position, there will be a close interfit of all of the projecting parts produced by the depression 11 and including the seat 13 relatively to the parts of the depression 10, including the seat 12 in the cooperating adjacent plate 8$^a$. The circular or round spring 17 has a central opening 18 therein and diametrically opposed pairs of prongs or guards 19 which are slightly bent upwardly to provide lower convex bearing surfaces 20. These prongs or guards 19 have outer straight side edges which snugly engage the straight side walls of the parts of the depression 11 of the plate 9 on opposite sides of the central seat or depression 13, and by this means the circular or round spring 17 is held against rotative shifting movement, the prongs or guards in no manner entering into the function of the spring from a standpoint of resiliency, but serving as stiff means which will obstruct the movement of the spring 17 as above specified. The spring is also formed with a boss 21 around the pivot opening 18, to form a raised seat for the head of the pivot and also to reinforce the spring at this point. The pairs of prongs or guards 19 at diametrically opposite portions of the spring 17, by their minimized dimensions, reduce the frictional bearing of said devices on the bottom of the depression 11 of the plate 16 with which they engage, but at the same time these prongs or guards maintain the said spring in its proper position against rotation in the latter plate. The boss 21 is so tapered and shaped that it will eliminate friction between the pivot head and the spring, or the pivot head is held out of contact with relation to the body of the spring, and as a consequence, there will be an easier and freer movement of the pivot head relatively to the spring. Moreover, the raised boss in addition to its reinforcing function will overcome any weakening of the spring due to punching of the latter.

The recesses 7 and 8 respectively formed in the overlapped extremities 5 and 6 of the rule sections have central counter recesses 22 and 23 opening thereinto, to give freedom of action of the parts at the center of the joint members and including the spring 17. The plates 8$^a$ and 9 are pivotally connected by a pivot stud 24 having a head 25 engaging the boss 21, the shank of the pivot stud passing through the openings 14 and 15 of the plates 8ª and 9 and also through the opening 18 of the spring which is alined with the said openings 14 and 15. The head 25 of the pivot stud 24 is disposed centrally with relation to the counter recess 23, and on the opposite end of the pivot stud a washer 26 is secured and is located in the counter recess 22. By thus mounting the pivot stud in the plates 8ª and 9 and spring 17 with the head 25 of the pivot stud bearing upon the boss 21, a reliable pivot joint is produced.

The circular or round spring 17 resists loose movement of the one rule section extremity relatively to the other when the two extremities are opened, so as to separate the projection formed by the depression of one hinge plate from the depression of the remaining hinge plate, and under these conditions the spring is compressed, as clearly shown by Fig. 3, and all the spring action is directly in the center of the joint. The prongs or guards 19 necessarily have a slight riding action on the bottom of the depression 11 on opposite sides of the center of the latter and the lower convex sides of the said prongs or guards provide for a quick or sensitive movement when the spring is depressed or returns to its normal position.

The circular spring 17 is held positive and against displacement in the seat or depression 13, particularly in view of the engagement of the prongs or guards 19 with the straight side walls of the parts of the depression 11 of the plate 9, and whereby the spring action is regularly concentrated or confined around the pivot stud 24, and the said spring acts evenly and positively at all times with respect to the moveable rule section with which it cooperates without liability of displacement when the rule section is opened or closed. Moreover, the round spring 17 is less liable to fracture and in fact will resist fracture and be preserved in its normal spring tension, as there are no long prongs projecting at opposite sides and located in the longitudinal portions of the recess, for instance the depression 11 of the plate 9, as in the common forms of springs heretofore used in spring rule joints of this type. Added to this circular formation of the spring and its advantageous functions just specified are the prongs 19 of a non-resilient character, these prongs being rigid or fixed and simply serving as bearing or retaining means for the spring. The prongs 19 will be treated primarily to render them non-yielding or non-resilient and to serve their particular function, as hereinbefore explained. It is a well understood fact that the metal of springs rapidly crystallizes at points where a spring is subjected to a constant compressing and expanding action and particularly in springs where parts are reduced and extend away from the main body of the spring, and this crystallization weakens the spring, not only from a standpoint of resiliency but also results in fracture and inoperativeness of the spring so affected. It is also well known that where an opening is formed through the center of the body of a spring, the latter is weakened by the formation of such opening, and in the class of spring rule joints to which this improvement pertains, the rapid opening and closing of the rule sections in a comparatively short time results in a breakage of the springs interposed between the joints of the sections, and the rule sections with the broken spring associated therewith works loose and is not reliable in the desired operation thereof. In the present improvement this disadvantage is reduced to a minimum, in view of the fact that the spring regularly surrounds the pivot stud without any elongated prongs or supporting devices that are liable to lose their resiliency or become broken.

The improved rule joint structure, including the main element or circular or round spring, will be effective from a standpoint of durability, in view of the absence of projecting parts that are always liable to become broken or fractured and thus seriously impair the practical operation of the joints during their opening and closing movements.

What is claimed as new is:

1. A rule joint comprising rule sections, a pair of hinge plate secured to the sections and respectively having an interlocking projection and recess, a circular bowed spring interposed between one of said plates and a portion of one of the rule sections and provided with minimized projections at diametrically opposite points to hold the spring against shifting movement by permitting it to have free compressible and expansible resilient action, and a stud pivotally connecting said plates and passed through the centers of the plates and spring, the spring being confined solely around the stud and filling a portion of the recess of the plate which it engages and held against rotation with the stud.

2. In a rule joint, rule sections, a pair of interlocking hinge plates secured to the opposing portions of the rule sections and each having an interlocking projection and recess, the projections and recesses of the respective plates being enlarged in circular form at the centers, a concealed circular bowed spring confined in the central circular enlarged portion of the recess of one of the plates and disposed between the latter and a portion of one of the sections, the spring having pairs of oppositely disposed non-resilient guards engaging the side walls of the recess of the plate in which the spring is mounted, and a pivot stud extending through the centers of the plates and spring.

3. In a rule joint, rule sections, a pair of hinge plates respectively secured to adjacent extremities of the sections and having intermeshing recesses and projections formed as portions of the meeting faces thereof and enlarged at their centers, a circular bowed spring mounted in the central enlarged recess of one of the plates and disposed between the latter and a portion of one of the rule sections, the spring being provided with diametrically opposed pairs of spaced prongs of minimized extent engaging opposite side walls of the recess of the plate in which the spring is mounted to hold the spring against lateral displacement and prevent rotation of the same, and a stud passed through the centers of the plates and spring.

4. In a rule joint, rule sections, a pair of hinge plates respectively connected to the extremities of said sections and having intermeshing portions, a concealed circular bowed spring held between one of the plates and a portion of one of the sections and provided with diametrically opposed non-resilient devices of minimum extent and which engage opposite parts of the plate engaged by the spring to confine the latter in place at the center of the plate against rotation and displacement, the said non-resilient devices of minimum extent having loose contact wtih the plate in which the spring is mounted on opposite sides of the spring, and a pivot stud passed through the centers of the plates and spring.

5. A rule joint comprising rule sections, a pair of hinge plates respectively secured to the extremities of the said sections and provided with relatively separable interfitting portions, a circular bowed spring seated and confined in its action in the center of one plate and between the latter and a portion of one of the sections and cooperating with the remaining plate to materially reduce the spring longitudinally with relation to the plates and centralize the spring action to avoid fracture of the spring by continued movement of the rule sections cooperating therewith, the spring having opposed minimized rigid prongs continually bearing on the plate in which the spring is disposed without resilient action to confine the latter action solely in the circular body of the spring, and a pivot stud passed through the centers of the plates and spring.

6. A rule joint comprising a pair of hinge plates for attachment, respectively, to a pair of rule sections, one of said plates having a substantially circular depression in one of its faces at approximately the center of said face and having a projection on its opposite face, the other of said plates having a depression in one of its faces adapted to interlock with the projection of said first-named plate, a substantially circular bowed spring seated in the depression of said first-named plate and having its resilient action wholly confined in said depression, said spring having means to prevent it from rotating in said depression, and a pivot stud extending through the centers of said spring and of the depressions and projection of said plates.

In testimony whereof I have hereunto set my hand in presence of two subscribing witnesses.

CHARLES G. WATSON.

Witnesses:
PHILIP R. WESTCOTT,
MARY E. SCOTT.